United States Patent [19]
Muller et al.

[11] Patent Number: 5,334,689
[45] Date of Patent: Aug. 2, 1994

[54] PROCESS FOR PREPARING FLEXIBLE POLYURETHANE FOAMS

[75] Inventors: Louis Muller, Ottenburg; Gabriel Verhelst, Herent, both of Belgium

[73] Assignee: Imperial Chemical Industries PLC, London, United Kingdom

[21] Appl. No.: 180,740

[22] Filed: Jan. 12, 1994

Related U.S. Application Data

[60] Continuation of Ser. No. 112,725, Aug. 27, 1993, which is a division of Ser. No. 48,094, Apr. 12, 1993, Pat. No. 5,270,348.

[30] Foreign Application Priority Data

Apr. 16, 1992 [GB] United Kingdom ............... 9208377.3

[51] Int. Cl.$^5$ ..................... C08G 18/70; C08G 18/30
[52] U.S. Cl. ................................. 528/67; 252/182.22; 525/458; 525/460; 528/76
[58] Field of Search ................... 528/67, 76; 525/458, 525/460; 252/182.22

[56] References Cited

U.S. PATENT DOCUMENTS

| | | | |
|---|---|---|---|
| 3,094,495 | 6/1963 | Gemeinhardt | 260/2.5 |
| 3,939,105 | 2/1976 | Jones et al. | 260/2.5 |
| 4,055,548 | 10/1977 | Carleton et al. | 260/77.5 |
| 4,082,703 | 4/1978 | Duffy et al. | 260/2.5 |
| 4,365,025 | 12/1982 | Murch et al. | 521/159 |
| 4,377,645 | 3/1983 | Guthrie et al. | 521/137 |
| 4,384,050 | 5/1983 | Guthrie | 521/137 |
| 4,644,018 | 2/1987 | Bowditch et al. | 521/130 |
| 4,882,112 | 11/1989 | Maki et al. | 264/109 |
| 4,895,883 | 1/1990 | Pedain et al. | 521/159 |
| 4,942,214 | 7/1990 | Sakhpara | 528/59 |

FOREIGN PATENT DOCUMENTS

| | | |
|---|---|---|
| 0022617 | 1/1981 | European Pat. Off. . |
| 0392788 | 10/1990 | European Pat. Off. . |
| 0442631 | 8/1991 | European Pat. Off. . |
| 0231214 | 12/1985 | Fed. Rep. of Germany . |

Primary Examiner—Morton Foelak

[57] ABSTRACT

Process for preparing a flexible foam by reacting an isocyanate prepolymer having a free NCO content of 2–15% by weight, an isocyanate prepolymer having a free content of 25–31% by weight and an isocyanate-reactive composition comprising water.

2 Claims, No Drawings

PROCESS FOR PREPARING FLEXIBLE POLYURETHANE FOAMS

CROSS-REFERENCE RELATED APPLICATIONS

The present application is a continuation of co-pending application Ser. No. 08/112,725 filed Aug. 27, 1993 entitled "Process for Preparing Flexible Polyurethane Foams" which in turn is a divisional of patent application Ser. No. 08/048,094 filed Apr. 12, 1993, now U.S. Pat. No. 5,270,348.

This invention relates to a process for preparing flexible polyurethane foams, reaction systems for preparing such foams and polyisocyanate compositions useful for preparing such foams.

The preparation of flexible polymeric polyurethane foams is widely known.

In EP 392788 a method has been described using an isocyanate prepolymer having a free NCO content of from 2 to 15% by weight and another polyisocyanate. The other polyisocyanate preferably is a diphenylmethane diisocyanate like MDI isomer mixtures, MDI variants and crude or polymeric MDI.

Surprisingly it has been found that the use of the above prepolymer together with another prepolymer gives improved processing and a reduced number of closed cells and foam defects, even without using surfactant. In addition to that improvements regarding resilience and hysteris have been observed.

Therefore the present invention is concerned with a method for the preparation of a flexible polyurethane foam by reacting an isocyanate prepolymer having a free NCO content of from 2 to 15% by weight which prepolymer has been made from a polyoxyalkylene polyol which has an ethylene oxide content of up to 30% by weight and another isocyanate prepolymer having a free NCO content of 25–31% by weight which prepolymer has been made from a polyoxyalkylene polyol which has an ethylene oxide content of at least 50% by weight, the weight ratio of the first and the second prepolymer ranging from 1.5-19:1, with an isocyanate-reactive composition comprising at least 40% by weight of water. Isocyanate-terminated prepolymer in this context is defined as the reaction product of excess polyisocyanate and polyol including the unreacted polyisocyanate and any polyisocyanate which is added after the reaction took place.

The isocyanate-terminated prepolymer having a free NCO content in the range from 2 to 15% by weight is obtained by reacting a polyoxyalkylene polyol having an average nominal functionality of 2 to 8, a number average equivalent weight in the range from 500 to 5000 and an ethylene oxide content of up to 30% by weight with a stoichiometric excess of a polyisocyanate and in particular of a diphenylmethane diisocyanate composition. This prepolymer will be referred to as "the first prepolymer" hereinafter.

Diphenylmethane diisocyanate compositions which may be used in the preparation of this first prepolymer include "pure" MDI preferably containing at least 55% by weight of the 4,4'-isomer. Suitable isocyanates therefore include the substantially pure 4,4'-isomer and isomer mixtures containing not more than 40%, preferably not more than 30%, and more preferably not more than 20% by weight of the 2,4'-isomer and not more than 5% by weight of the 2,2'-isomer. Other suitable diphenylmethane diisocyanate compositions include modified forms of these diphenylmethane diisocyanates, that is to say MDI containing at least 60% by weight of the 4,4'-isomer modified in known manner by the introduction of urethane, allophanate, urea, biuret, carbodiimide, uretonimine or isocyanurate residues. These so-called MDI variants particularly include uretonimine-modified MDI having NCO contents of at least 25% by weight and polyether-based prepolymers having NCO contents of at least 20% by weight. Diphenylmethane diisocyanate compositions containing pure MDI and polymeric fillers may also be used in the preparation of the first prepolymer. MDI compositions containing polymeric fillers have been described in the prior art and include polyurea dispersions in MDI and prepolymers based on MDI and polymer polyols containing dispersed polymer particles having an NCO content of at least 20% by weight. In these products, it is generally preferred that the dispersed polymer particles have an average particle size of less than 50 microns.

Further diphenylmethane diisocyanate compositions which may be used in the preparation of the prepolymer include compositions containing polymethylene polyphenylene polyisocyanates. Thus, mixtures may be used containing at least 70% by weight of pure MDI and up to 30% by weight of the so-called crude MDI containing from 35 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Still further diphenylmethane diisocyanate compositions which may be used in preparing the first prepolymer include mixtures of the above described MDI types and up to 20% by weight of other polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates and mixtures thereof.

Whereas a preferred embodiment of the invention involves the use of methylene-bridged polyphenyl polyisocyanates as disclosed hereinabove, the first prepolymer may also be made from other polyisocyanates, such as in particular aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates.

Preferred tolylene diisocyanate compositions for use in this embodiment of the invention are the so-called TDI 80/20 (a 80:20 mixture of 2,4-tolylene diisocyanate and 2,6-tolylene diisocyanate), TDI 65/35 (a 65:35 mixture of 2,4-tolylenediisocyanate and 2,6-tolylenediisocyanate), and high -NCO prepolymers thereof.

The polyols used in the preparation of the first prepolymer have an average nominal hydroxyl functionality of 2 to 8. The term "nominal functionality" refers to the functionality, with respect to isocyanates, a polyol would be expected to have having regard to its monomeric components.

For example, a polyether prepared by the addition of propylene oxide to a glycol will have a nominal hydroxyl functionality of 2 although, in fact, its average functionality will be somewhat less than 2.

Thus, for a polyether polyol, the average nominal functionality is the average functionality (number of active hydrogen atoms) of the initiator or initiators used in its preparation.

The average nominal functionality of the polyols preferably is 2 to 4, more preferably 2 to 3. Number average equivalent weights of the polyols used are in the range from 750 to 5000, preferably in the range from 1000 to 4000. The ethylene oxide content of the polyols used is up to 30% by weight calculated on the total weight of the polyol. Mixtures of two or more polyols varying in functionality, equivalent weight and/or chemical constitution may be used provided such mixtures conform to the average functionality, average equivalent weight and ethylene oxide content criteria specified herein.

Polyoxyalkylene polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Further particularly useful polyether polyols include polyoxypropylene diols and triols obtained by the simultaneous or sequential addition of ethylene and propylene oxides to di- or trifunctional initiators as fully described in the prior art provided the ethylene oxide content is not higher than 30% by weight. Random copolymers, block copolymers and random/block copolymers having oxyethylene contents of up to 30%, based on the total weight of the polyol may be used. Mixtures of the said diols and triols can be particularly useful. Other particularly useful polyether polyols include polytetra-methylene glycols obtained by the polymerisation of tetrahydrofuran. Particularly useful are also mixtures of polypropylene oxide—polyethylene oxide polyols with up to 5% of another polyol, for example a polyalkylene oxide, a polyester polyol, a polycarbonate polyol, a polyacetal polyol or a polytetramethylene glycol.

Other polyols which may be used comprise dispersions or solutions of addition or condensation polymers in polyols of the types described above. Such modified polyols have been fully described in the prior art and include products obtained by the in situ polymerisation of one or more vinyl monomers, for example styrene and acrylonitrile, in polyether polyols, or by the in-situ reaction between a polyisocyanate and an amino- and-/or hydroxy-functional compound, such as triethanolamine, in a polyol.

The first isocyanate-terminated prepolymer may be prepared by reacting the polyisocyanate with the polyol under conditions that have been fully described in the prior art for the preparation of prepolymers. Reaction temperatures of 40° to 90° C. are generally suitable for the preparation of the prepolymers. To achieve a final NCO content within the range 2 to 15% by weight, an initial ratio of isocyanate to hydroxyl groups would typically be within the range from 3:1 to 20:1. Preferred prepolymers are made by reacting the starting materials at an initial ratio of isocyanate to hydroxyl groups in the range from 3.5:1 to 15:1, especially 4:1 to 10:1, to give prepolymers having free NCO contents of 4 to 12%, especially of 5 to 10% by weight. After the reaction took place one or more of the polyisocyanates mentioned before may be added to the reaction product. The amount of the polyisocyanate added should be such that the prepolymer still has an NCO content of 2 to 15% by weight.

In addition to the first prepolymer, another prepolymer is used in the process according to the invention.

The prepolymer having a free NCO content of 25–31% by weight, hereinafter referred to as the second prepolymer is made from a polymethylene polyphenylene polyisocyanate having an isocyanate functionality of 2.5–3.0 and a polyoxyalkylene polyol having a nominal hydroxyl functionality of 2–6 and a number average equivalent weight of from 250 to 3000. The polyol should have an ethylene oxide content of at least 50% and preferably of 60 to 90% by weight calculated on the whole polyol. The polyisocyanates and polyols may be selected from those mentioned hereinbefore for preparing the first prepolymer provided the polyisocyanates and polyols conform to the above restrictions. The second prepolymer is prepared in a similar way as the first one with the proviso that the NCO:OH ratio in general is higher in order to obtain a prepolymer having a free NCO content of 25–31% by weight. After the reaction took place one or more of the polyisocyanates mentioned before may be added provided the NCO content remains 25–31% by weight.

In order to prepare the foam, preferably 100 parts by weight of a polyisocyanate composition comprising 60–95% by weight of the first prepolymer and 5–40% by weight of the second prepolymer calculated on the total weight of the first and the second prepolymer is reacted with 1 to 20 parts by weight of the isocyanate-reactive composition in the presence as necessary of conventional additives which may for convenience be included in the isocyanate-reactive composition or, if inert towards isocyanates, in the polyisocyanate or as an additional stream.

In many cases, water will be the sole isocyanate-reactive species present in the isocyanate-reactive composition. In addition to containing water, however, the isocyanate-reactive composition may also contain up to 60% by weight of other isocyanate-reactive compounds, in particular those having an average equivalent weight below 500. Preferably the isocyanate-reactive composition comprises at least 50% by weight of water, and for certain applications at least 95% by weight. Further the isocyanate-reactive composition may comprise a minor amount of a higher molecular weight polyol.

Suitable isocyanate reactive compounds having an average equivalent weight below 500 are polyfunctional isocyanate-reactive aliphatic, cycloaliphatic, aromatic or araliphatic compounds or mixtures thereof like ethylene glycol, propylene glycol, dipropylene glycol, 1,4-butane diol, sorbitol, monoethanolamine, diethanolamine, 1,2-diaminoethane, amine-terminated polyethers of molecular weight below 1000, isophorone diamine (1-amino-3-amino-3,5,5-trimethyl cyclohexane), fully hydrogenated di(aminophenyl)methane, piperazine, hydrogenated methylene dianiline, diamino menthane and hydrogenated toluene diamine, diethyl toluene diamine and Mannich derivatives of phenols or alkyl phenols, particularly Mannich condensates of phenol or phenol derivatives, formaldehyde and diethanolamine like 2,5 bis (N,N-diethanolamine)-4-nonylphenol.

Additives which may be used include the catalysts commonly disclosed in the literature, such as for example tertiary amines and tin compounds, surface-active agents and foam stabilisers, for example siloxane-oxyalkylene copolymers, flame retardants, organic and inorganic fillers, pigments and internal mould release agents. Preferably the process according to the invention is conducted in the absence of a chlorofluorocarbon blowing agent like trichlorofluoromethane.

The reaction for preparing the flexible foams according to the present invention in general is conducted at an index of from 35 to 125 preferably of from 45 to 105; the index being defined by the formula $$\text{index} = \frac{\text{equivalents of NCO} \times 100}{\text{equivalents of isocyanate-reactive groups}}.$$

The present invention is further concerned with a polyisocyanate composition comprising 60-95% by weight of an isocyanate prepolymer having a free NCO content of from 2 to 15% by weight which prepolymer has been made from a polyoxyalkylene polyol which has an ethylene oxide content of up to 30% by weight and 5-40% by weight of another isocyanate prepolymer having a free NCO content of 25-31% by weight which prepolymer has been made from a polyoxyalkylene polyol which has an ethylene oxide content of at least 50% by weight, the % by weight of the first and the second prepolymer being calculated on the total weight of the first and the second prepolymer.

As is known producers of polyisocyanates, isocyanate-terminated prepolymers and polyols are often not producing the foams; they sell the above chemicals to a foam producer. Often a fully formulated reaction system is sold to a foam producer; i.e. a polyisocyanate composition and a polyol composition comprising all other ingredients, like blowing agent, catalysts etc, are sold as a reaction system in separate containers in order to allow the customer to make a specific foam by reacting the two compositions. This approach provides a relatively simple way to the customer to make a product from often a variety of chemicals by combining two compositions under appropriate conditions. A disadvantage of this approach is that the foam producer is limited in adapting the reaction system to his specific needs. Therefore it is considered advantageous in the context of the present invention not to provide a mixture of the first and the second prepolymer but rather to provide the first and the second prepolymer separately in a reaction system also comprising the isocyanate-reactive composition. Consequently the invention is concerned with a reaction system comprising (A) an isocyanate prepolymer having a free NCO content of from 2 to 15% by weight which prepolymer has been made from a polyoxyalkylene polyol which has an ethylene oxide content of up to 30% by weight and (B) another isocyanate prepolymer having a free NCO content of 25-31% by weight which prepolymer has been made from a polyoxyalkylene polyol which has an ethylene oxide content of at least 50% by weight, the weight ratio of the first and the second prepolymer ranging from 1.5-19:1 and (C) an isocyanate-reactive composition comprising at least 40% by weight of water. Preferably the reaction system comprises 60-95% by weight of the first prepolymer, 5-40% by weight of the second prepolymer, calculated on the total weight of the first and the second prepolymer, and 1-20 parts by weight of the isocyanate-reactive composition per 100 parts by weight of first and second prepolymer.

The term "reaction system" is defined as a combination of ingredients for preparing the flexible foams according to the present invention which ingredients are kept in separate containers and which ingredients are sold and marketed for preparing said flexible foams. Hence the ingredients (A), (B) and (C) are kept separate in the above reaction system.

The reaction system with the separate prepolymers provides the foam producer with the opportunity to supply the prepolymers independently from each other to the isocyanate-reactive composition. Therefore a preferred embodiment of the process according to the present invention is to bring the first and the second prepolymer independently from each other into contact with the isocyanate-reactive composition. In general this is conducted by providing a conducting device, like a pipe, from a container containing the first prepolymer to a mixing head or a reaction zone of a device for making foams and a second conducting device from a container containing the second prepolymer to the said mixing head or reaction zone and a third conducting device from a container containing the isocyanate-reactive composition to the said mixing head or reaction zone. The important feature of the embodiment is providing the two prepolymers from separate containers giving the foam producer the opportunity to adapt their relative amounts. It is within this embodiment to combine the first two conducting devices to one single conducting device just before or at the reaction zone or the mixing head. It is also within this embodiment to provide the first and the second conducting device from the respective containers to a mixing zone wherein the two prepolymers are mixed and to provide a conducting device from this mixing zone to the said reaction zone or mixing head wherein the prepolymer mixture is brought into contact with the isocyanate-reactive composition.

It will be clear to those skilled in the art that likewise the isocyanate-reactive ingredients and/or the other polyisocyanates mentioned before could be provided to the reaction zone or the mixing head via more than one conducting device. For certain applications this approach may be preferred in particular for preparing slab-stock flexible foams.

In carrying out the invention it is most appropriate to form a homogeneous liquid mixture of the prepolymers prior to their reaction with the isocyanate-reactive composition.

The homogeneous liquid mixture is created by metering specific amounts of the prepolymers into a mixing zone at controlled rates to produce the desired weight ratio of prepolymers. Preferably this mixing zone involves high shear mixing or impingement mixing. Each prepolymer is fed into the mixing zone as a separate metered stream using appropriate liquid metering pumps from a storage tank. If necessary, the storage tanks and pumping systems may be heated such that the prepolymers entering the mixing zone are at the desired viscosity and temperature, after which mixing they may be fed into a reaction zone to react with the isocyanate-reactive composition to form the desired foam.

The mixing zone can suitably be an appropriately shaped container having high shear mixing. The container can suitably be a closed cylinder having a multiplicity of entrance ports which are preferably diametrically opposed such that the advantage of impingement mixing is realised in addition to the mixing forces applied by high shear mixing blades, rotating therein.

High shear mixing forces are usually provided by appropriately shaped mixing blades rotating at high speeds and located at the centre of the mixing zone. In addition to the isocyanate other additives may be incorporated at the mixing zone such as catalysts, surfactants, colouring agents, stabilisers and the like.

After mixing for a finite period of time to form a homogeneous mix, the isocyanate blend may be temporarily stored in a holding zone or transferred instantly to a reaction zone.

The reaction zone may be an adjacent portion of the mixing container or a separate container. A preferred mixing device comprises an elongated cylindrical container having high shear mixing blades mounted on a rotating shaft passing the length of the cylinder. The diameter and length of the cylindrical mixing device is sized appropriately to match the feed rate, holdup time and cream time required. Multiple feed ports are positioned at one end of the container to receive unmixed isocyanates and other additives while an exit port is located at the opposite end of the container to emit mixture.

The method of the invention may be used to produce moulded or slabstock foam continuously, semi-continuously or badge-wise.

The invention is illustrated but not limited by the following examples in which all parts and percentages are by weight unless otherwise stated.

The following glossary of materials is included to identify reaction components not otherwise identified in the examples.

Glossary

Prepolymer 1 The reaction product of a polyol having a functionality of 3, an ethylene oxide content of about 14% by weight (tip) and a molecular weight of about 4500 and pure MDI having a 2,4' isomer content of 10% by weight, the prepolymer having an NCO content of 6.5% by weight.
Polymeric MDI Polymeric MDI having an NCO content of 30.7 and a functionality of 2.7 and a diisocyanate content of 42% by weight.
Prepolymer 2a The reaction product of the above polymeric MDI with 4% by weight of a polyol having a molecular weight of about 4000, a functionality of 3 and an ethylene oxide content of 75% by weight; the ethylene oxide being randomly distributed. The NCO content is 29.4% by weight.
Prepolymer 2b As prepolymer 2a with the proviso that 6% by weight of the polyol is used. The NCO content is 28.7% by weight.
Prepolymer 2c As prepolymer 2a with the proviso that 10% by weight of the polyol is used. The NCO content is 27.4% by weight.
Polyol A polyol having a molecular weight of about 4000, a functionality of 3 and an ethylene oxide content of 75% by weight; the ethylene oxide being randomly distributed.
Niax A1 Catalyst from Union Carbide.
SH 210 Silicon surfactant from Union Carbide.
D33 LV Catalyst from Air Products.
DMI 1,2-dimethyl-imidazole Example Flexible foams were prepared by combining the ingredients given in Table 1. The physical properties of the foams obtained are given in Table 1 as well.

TABLE I

| | Experiment | | | | | |
|---|---|---|---|---|---|---|
| | 1 | 2 | 3 | 4 | 5 | 6 |
| Prepolymer 1 | 80 | 80 | 80 | 80 | 86.66 | 86.66 |
| Polymeric MDI | 20 | — | — | — | 13.44 | — |
| Prepolymer 2a | — | 20 | — | — | — | 13.44 |
| Prepolymer 2b | — | — | 20 | — | — | — |
| Prepolymer 2c | — | — | — | 20 | — | — |
| Polyol | — | — | — | — | 0.5 | — |
| $H_2O$ | 4.6 | 4.6 | 4.6 | 4.6 | 3.32 | 3.32 |
| Niax A1 | 0.2 | 0.2 | 0.2 | 0.2 | — | — |
| SH 210 | — | — | — | — | 0.4 | — |
| D33 LV | 0.4 | 0.4 | 0.4 | 0.4 | — | — |
| $DMI/H_2O$ 80/20 | — | — | — | — | 0.6 | 0.6 |
| Index | 52 | 51 | 50 | 49 | 60 | 60 |
| Free rise density, $Kg/m^3$ | 24 | 25 | 25 | 26 | 36 | 35 |
| Open/closed cell content | very closed, skrinked | closed; easily crushable | ±open | open | open | open |
| Resilience, % | — | — | — | — | 51 | 54 |

The foam according to experiment 6 which is according to the present invention did not show surface defects although no surfactant was used while the foam according to experiment 5 which is a comparative example showed some surface defects despite the fact that a surfactant was employed.

In experiments 1–4 the foams were made by first mixing the polyisocyanates with each other and by mixing the water with the catalysts and then by combining the two mixtures in an open container wherein they were allowed to react.

In experiments 5 and 6 the ingredients used were fed independently from commercially available equipment including individual holding tanks each equipped with a metering pump and preheater into a mixing device manufactured by Viking PTI Ltd as Model No. TC 1167 according to the proportions as outlined in Table 1. The elongated cylindrical mixing head employed has an I.D. of 10 cms, and a length of 50 cms with centrally mounted rotating shaft having sixty two 0.8 cm O.D. high shear mixing blades mounted 2 centimeters apart along the length of the 40 centimeter shaft. Entrance ports are positioned 2.5 cms from the top of the mixing end of the container. Additives are fed in to the mixing zone through feed ports located 13 cms below the prepolymer and isocyanate feed ports. A cream exit port of 5 cms I.D. is centrally located at the bottom of the cylinder. The water feed port is positioned in the side wall at a position 15 cms below the isocyanate feed ports. In operation with a shaft rotating speed of 3000 RPM, the total feed weight of the ingredients entering the mixing device ranges from 100–150 kg/min. to adjust a holdup time in the isocyanate mixing zone at 400 to 269 microseconds prior to entering the formation zone for the creaming mixture, where the holdup time is 1.5 to 0.8 seconds. The creaming mixture is fed from the mixing device to a creaming and/or foaming zone to produce flexible slabstock foam.

We claim:
1. Polyisocyanate composition comprising 60–95% by weight of an isocyanate prepolymer having a free

NCO content of from 2 to 15% by weight which prepolymer has been made from a polyoxyalkylene polyol which has an ethylene oxide content of up to 30% by weight and 5–40% by weight of another isocyanate prepolymer having a free NCO content of 25–31% by weight which prepolymer has been made from a polyoxyalkylene polyol which has an ethylene oxide content of at least 50% by weight, the % by weight of the first and the second prepolymer being calculated on the total weight of the first and the second prepolymer.

2. Polyisocyanate composition according to claim 1 characterised in that the second prepolymer is made from a polymethylene polyphenylene polyisocyanate having an isocyanate functionality of 2.5–3.0 and a polyoxyalkylene polyol having an average nominal hydroxyl functionality of 2–6 and a number average equivalent weight of from 250 to 3000.

* * * * *